United States Patent [19]

Anzai et al.

[11] 4,088,183
[45] May 9, 1978

[54] THERMAL ENERGY STORAGE TANK

[75] Inventors: Shunichi Anzai, Hitachi; Akira Uenishi, Mito; Takeshi Sakamoto, Ibaraki, all of Japan

[73] Assignee: Agency of Industrial Science & Technology, Tokyo, Japan

[21] Appl. No.: 782,939

[22] Filed: Mar. 30, 1977

[51] Int. Cl.² .................................. F28D 21/00
[52] U.S. Cl. ........................ 165/104 S; 126/400; 165/158
[58] Field of Search ............. 165/104 S, DIG. 4, 158; 126/400; 219/378, 365, 341, 325, 326, 302

[56] References Cited

U.S. PATENT DOCUMENTS

| 3,080,706 | 3/1963 | Flynn, Jr. et al. | 126/400 X |
| 3,163,209 | 12/1964 | Shinn | 126/400 X |
| 3,485,216 | 12/1969 | Lawrence | 126/400 X |

Primary Examiner—Albert W. Davis, Jr.
Attorney, Agent, or Firm—Beall & Jeffery

[57] ABSTRACT

A thermal energy storage tank charged with a phase changeable thermal energy storage material produces a partial pressure variation due to the flow of a heat transfer medium, when passing through the thermal energy storage material. An attempt is made to provide the uniform phase changeable of the thermal energy storage material by passing the heat transfer medium therethrough, over the throughout of the thermal energy storage material, by providing a variety to the flow direction of the heat transfer medium. For instance, according to the achievement of uniform flow of heat transfer medium in the vertical direction, there may be attained uniform phase changeable both in an upper portion and in a lower portion of the thermal energy storage material.

1 Claim, 4 Drawing Figures

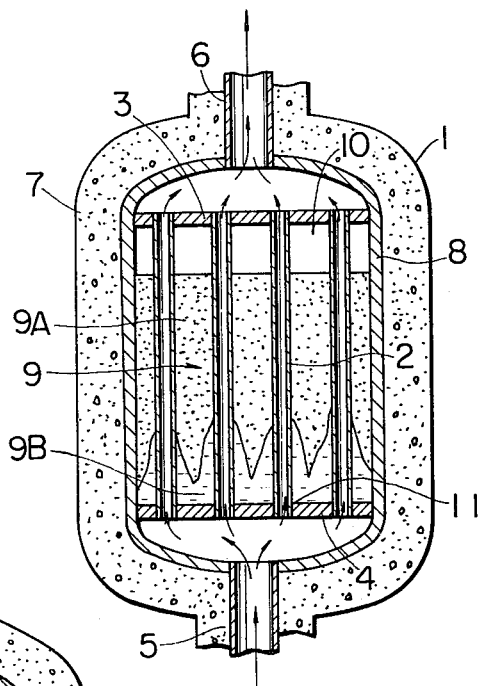
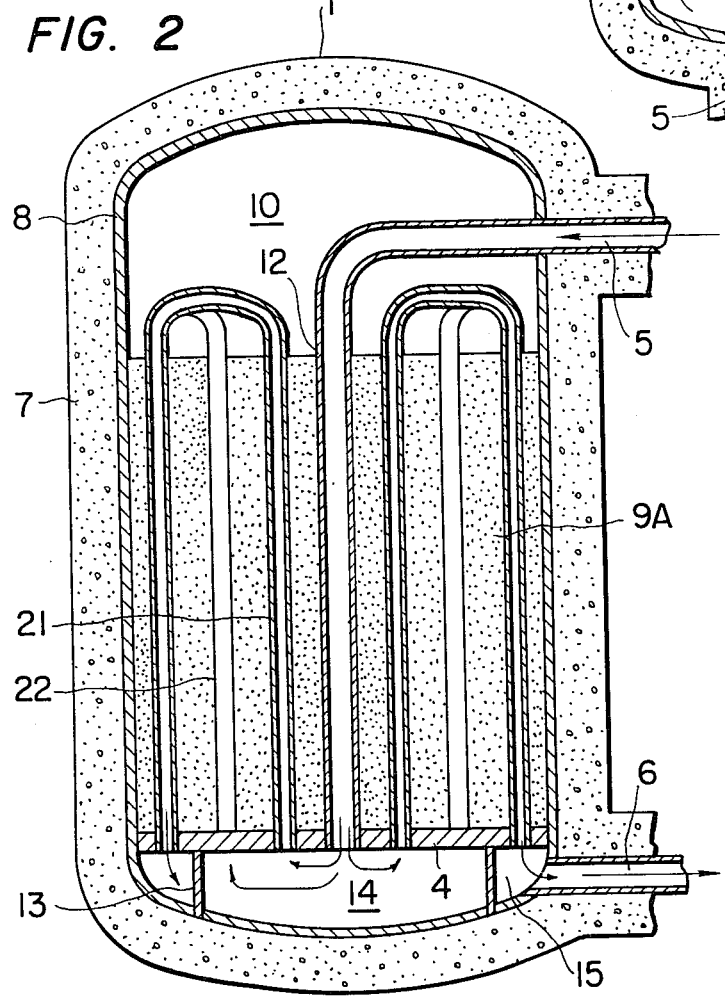

THERMAL ENERGY STORAGE TANK

BACKGROUND OF THE INVENTION

1. Field of the Invention

This invention relates to a thermal energy storage tank utilizing a phase changeable thermal energy storage material, and more particularly to improvements in the construction thereof.

2. Description of the Prior Art

A phase changeable material or meltable material (This will be referred to as a thermal energy storage material, as the case may be.) presents a large amount of latent heat upon shifting of one phase to another i.e., from liquid to solid (solidification) or from solid to liquid (liquefaction). Stated differently, the above material may retain a large heat capacity without being attended with a temperature change. The above property of the phase changeable material is used for the purposes of thermal energy storage or coldness preservation (This may be regarded as thermal energy storage in the sense of the accumulation of negative heat. However, thermal energy storage and coldness-preservation will be dicriminated in use, except in connection with a thermal energy storage tank).

A system which needs thermal energy storage is a solar-thermal electric power plant. In this case, it is preferable to use as a thermal energy storage material a meltable material having a high melting temperature and a large amount of latent heat, such as eutectic salts KF—LiF—NaF (Mol % . . . 42 to 46.5 – 11.5; melting temperature . . . 454° C; latent heat . . . 95 kcal/kg) for compensating for a time-inconformity between an insolation time zone and a loading time zone.

On the other hand, as an example of coldness-preservation, water is used as a coldness-preserving material by freezing same by using excess electric power, so that the coldness of ice thus produced may be utilized for cooling during the day time.

A prior art thermal energy storage tank, for instance, a solar thermal electric power plant will be described in more detail with reference to FIG. 1.

Referring to FIG. 1, shown at 2 a heat exchange tube, at 4 a lower supporting disc, at 3 an upper supporting disc, at 5 a heat transfer medium inlet tube, at 6 a heat transfer medium outlet tube, at 8 a vessel covered with a heat insulating wall or layer 7 from externally, and at 9 a thermal energy storage material.

Thus, in case heat-collecting working water (This will be referred to as supply water hereinafter, as the case may be.) may be heated to a level to produce steam of a sufficiently high temperature due to satisfactory insolating condition, high temperature steam, as a heat transmitting medium, flows via an inlet tube 5 into the thermal energy storage tank 1, and passes through heat exchange tubes 2, where the steam imparts its latent heat to the thermal energy storage material 9 (This has remained in a solid state initially. This will be referred to as a thermal energy storage solid material 9A, hereinafter, as the case may be.) for accumulating latent heat therein.

Meanwhile, after imparting the aforesaid latent heat, steam will not be lowered to a temperature below the melting temperature of the thermal energy storage material in a normal condition, so that steam may be supplied, as it is, to a loading system after being discharged from the outlet tube 6.

On the other hand, in case supply water is not heated to a sufficient level due to an unsatisfactory insolation condition, steam of a relatively low temperature or water is introduced, as it is, through the heat exchange tubes 2 in the thermal energy storage tank 1, so that the supply water or steam of a relatively low temperature may be supplied with latent heat from the aforesaid thermal energy storage material 9 (This in general remains in a liquid state, and will be referred to as a thermal energy storage liquid material 9B, hereinafter, as the case may be.), so that water or steam may be heated to the melting temperature of the thermal energy storage material 9, and then supplied to a loading system as a high temperature steam.

However, the prior art thermal energy storage tank is found to be defective in its construction, because of a drawback arising from a volumetric change due to shifting from a solid phase to a liquid phase of the thermal energy storage material, and vice versa.

For instance, KF—LiF—NaF eutectic salt exhibits a volumetric increase of about 20%, when shifting from a solid phase to a liquid phase. Other thermal energy storage materials provide a tendency similar thereto.

The above drawback will be described in more detail with reference to the operation of the aforesaid thermal energy storage tank. The thermal energy storage material begins melting around the entrance of the heat exchange tube 2 for a heat transfer medium, i.e., in the neighborhood of a connecting portion between the heat exchange tube 2 and the lower supporting disc 4 (Refer to 9B). In this respect, an volumetric increase due to melting has been suppressed by unmelted thermal energy storage material 9A positioned above, so that a high stress is imposed on the heat exchange tube 2, lower supporting disc 4 and connecting portion 11 between the heat exchange tube and the lower supporting disc, thus damaging the thermal energy storage tank, if the case comes to the worst.

For avoiding the above drawback, it may be a solution to reverse the inflow direction of a heat collecting supply water, i.e., the direction from above to below, as viewed in FIG. 1.

In this case, the thermal energy storage material begins melting of an upper portion of the thermal energy storage tank and is retained in an upper space portion (gas layer) 10 of the vessel, thus avoiding the aforesaid drawback.

However, this attempt brings about another new problem that, during heat-removing operation, a heat transfer medium, i.e., steam of a relatively low temperature, or particularly water can not be distributed for respective heat exchange tubes uniformly.

In other words, when the flow rates of supply water through the heat exchange tubes 2 become lack of uniformity, then fluidic resistance of a heat exchange tube allowing an increased flow rate of water is reduced (because of faster cooling), so that the flow rate of supply water is further increased, resulting in an increased unevenness in flow rate of supply water for respective heat exchange tubes.

Attempts for avoiding this drawback are to provide an orifice resistance for the entrance of a heat exchange tube and to reduce the diameter of a heat exchange tube for increasing the flow speed of supply water, thereby improving the distribution of flow rates for respective heat exchange tubes.

However, the former attempt suffers from a disadvantage in that the supply water flows down along a localized surface of a heat exchange tube downstream of an orifice, thus failing to derived steam of a sufficiently high temperature, as in the preceding case. On the other hand, the latter attempt poses a disadvantage in that the length of heat exchange tubes should be increased excessively, for providing a desired heat exchange surface, thus resulting in an increase in pressure loss in a heat transfer medium system.

Description has been given thus far of heat exchange tubes of a linear form, with reference to FIG. 1. However, heat exchange tubes other than the linear tubes, i.e., spiral tubes or zig-zag tubes may be used, with the same shortcomings attended.

SUMMARY OF THE INVENTION

It is an object of the present invention to provide the thermal energe storage tank of an improved construction which avoids the drawbacks in the prior art vessels of this type.

According to the present invention, there is provided the thermal energy storage tank charged with a phase changeable thermal energy storage material, which vessel comprises: a descending tube running for directing a heat transfer medium from above to a lower distributing room; and two or more heat exchange tubes spaced a given equal distance from each other, for allowing heat transfer medium to ascend through the vessels, the aforesaid heat transfer medium being stored in the lower distributing room.

BRIEF DESCRIPTION OF THE DRAWINGS

FIG. 1 is a longitudinal cross-sectional view of a prior art thermal energy storage tank;

FIG. 2 is a longitudinal cross-sectional view of a thermal energy storage tank showing one embodiment of the invention;

DESCRIPTION OF THE PREFERRED EMBODIMENTS

Figure 3:
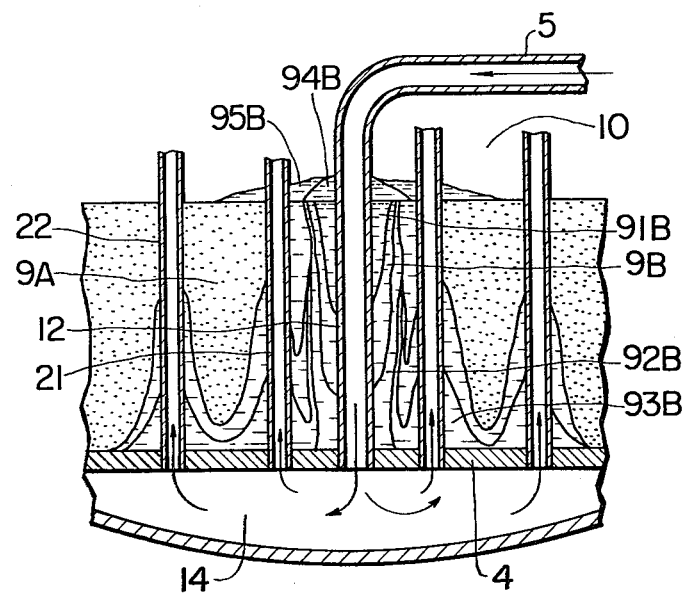
FIGS. 3 and 4 are partly enlarged, longitudinal cross-sectional views of thermal energy storage tank according to the present invention, for illustrating a solid-liquid shifting condition, upon heat accumulating operation.

The present invention will be described in more detail with reference to the accompanying drawings which indicate embodiments of the invention.

FIG. 2 is a longitudinal cross-sectional view of a thermal energy storage tank according to the present invention, which vessel is charged with a thermal energy storage solid material 9A exemplified as a phase changeable thermal energy storage material, in heat accumulating operation (in the case of a coldness-preserving operation, a thermal energy storage liquid material 9B, not shown, is used.).

Like parts are designated like reference numerals in common with FIG. 1. Shown at 12 is a descending tube for directing a heat transfer medium from above to lower distributing room 14 and at 21, 22 are heat exchange tube group which is adapted to permit the heat transfer medium stored in the distributing room 14 to ascend and descend through the thermal energy storage tank, with the aforesaid medium being shared by the respective heat exchange tubes. In addition, the heat exchange tubes are positioned at an equal spacing from each other for allowing uniform heat exchange over the throughout of thermal energy storage solid material 9A.

Shown at 15 is a confluent room, in which heat transfer medium past the heat exchange tubes may be joined together, and the confluent room 15 is partitioned by a dividing plate 13 from the distributing room.

With the aforesaid construction, high temperature steam, i.e., heat transfer medium, is introduced through an inlet tube 5 into the thermal energy storage tank 1, then through the descending tube 12 into the lower distributing room 14 to be distributed, then through the heat exchange tubes 21, 22 into the confluent room 15, and through outlet tube 6 to a loading system.

When the heat transfer medium passes through the descending tubes and heat exchange tubes, the thermal energy storage solid material 9A apparently accumulates heat due to the discharge of heat from the heat transfer medium.

The aforesaid heat accumulation will be described in more detail with reference to FIG. 3.

Due to the inflow of heat transfer medium, the thermal energy storage solid material 9A begins melting of the uppermost portion of the descending tube 12 (See thermal energy storage liquid material 91 B.), followed by the lower portion of the descending tube (92 B) and heat exchange tubes 21, 22 (93 B) in this order.

Accordingly, a liquid volumetric increment produced by the shifting of solid phase to a liquid phase of the thermal energy storage material will overflow as shown at 94 B and 95 B on to a gas layer 10 in the upper portion of the vessel, thus relieving stresses resulting from an increase in volume.

Thus, stresses are exerted on heat exchange tubes or lower supporting disc 4, thus eliminating danger of a damage of the thermal energy storage tank.

For coldness-preserving operation or heat discharging operation, water as a heat transfer medium is introduced into the thermal energy storage tank shown in FIG. 2, which has been charged with liquid 9B in place of thermal energy storage solid material 9A.

Figure 4:
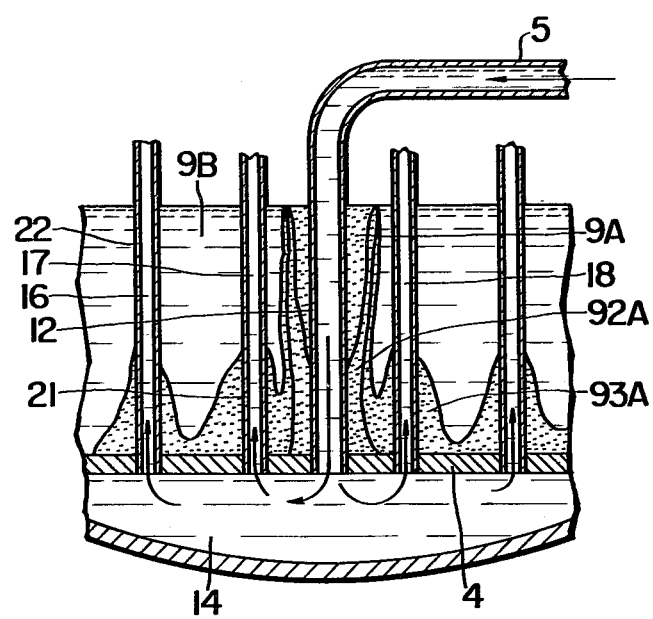

In this case as well, as shown in FIG. 4, supply water is introduced through the inlet tube 5 into the thermal energy storage tank, then through the descending tube into distributing room, and then distributed for heat exchange tubes 21, 22.

Water heads of supply water in respective heat exchange tubes are all maintained at the same level, because the heat exchange tubes are communicated with each other through the distributing room.

Even if the water head in one heat exchange tube differs from that in another heat exchange tube, it is apparent that the difference in water head will be immediately eliminated according to self-controlling principle of water heads.

Due to self-controlling principle of water heads, the distribution of flow rates of supply water for respective heat exchange tubes may be effected suitably, and in addition, the heat transfer from thermal energy storage material is gradually commenced with a supply water entrance, because of the construction of the thermal energy storage tank, so that uneven heat transfer or insufficient heat transfer may be avoided, while permitting uniform heat exchange over the throughout of a thermal energy storage material.

It should be understood that the description has been given of the essential part of the present invention, and that various modifications and alteration may be effected without departing from the spirit of the invention.

For instance, the heat exchange tubes should not necessarily be linear as shown in FIG. 2, but may be of a zig-zag form which may avoid the influence due to thermal expansion of heat exchange tubes themselves. Furthermore, the confluent room 15 may be set at the upper portion in the vessel 8, and in this case, it is desirable that the confluent room 15 be not firmly fixed in order to absorb the thermal expansion of the heat exchange tubes.

In addition, it is desirable that the upper, bent end portions of the heat exchange tubes be positioned in a gas layer for preventing thermal expansion from being suppressed by the thermal energy storage solid material 9 A.

As is apparent from the foregoing, the thermal energy storage tank according to the present invention may be devoid of a damage and allows satisfactory heat accumulation or coldness-preserving operation.

What is claimed is:

1. A thermal energy storage tank, comprising:
 a container covered with a heat insulating wall from externally, said container including a void space portion in its upper portion, and a lower distributing room in its lower portion, with its intermediate portion filled with a phase changeable thermal energy storage material;
 an inlet tube connecting said upper space portion to the exterior of said container;
 a descending tube directing a heat transfer medium supplied through said inlet tube from said upper space portion to said lower distributing room; and
 heat exchange tubes allowing said heat transfer medium stored in said lower distributing room to ascend through said thermal energy storage material, with said heat transfer medium being distributed for respective heat exchange tubes, and then back to a confluent room partitioned within said lower distributing room, said heat exchange tubes being positioned in equal spacing from each other and provided in plural number.

* * * * *